(12) United States Patent
Carson et al.

(10) Patent No.: US 8,433,143 B1
(45) Date of Patent: Apr. 30, 2013

(54) AUTOMATED DETECTION OF VIDEO ARTIFACTS IN AN INFORMATION SIGNAL

(71) Applicant: Doug Carson & Associates, Inc., Cushing, OK (US)

(72) Inventors: Eric M. Carson, Cushing, OK (US); Atul Ravindran, Tulsa, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 0 days.

(21) Appl. No.: 13/678,680

(22) Filed: Nov. 16, 2012

Related U.S. Application Data (60) Provisional application No. 61/583,072, filed on Jan. 4, 2012.

(51) Int. Cl.
*G06K 9/62* (2006.01)

(52) U.S. Cl.
USPC .......................................... 382/218

(58) Field of Classification Search .................... None
See application file for complete search history.

(56) References Cited

U.S. PATENT DOCUMENTS

| | | | |
|---|---|---|---|
| 4,628,369 A | 12/1986 | Ichinoi et al. | |
| 5,034,823 A | 7/1991 | Geerlings | |
| 5,243,664 A | 9/1993 | Tuy | |
| 6,122,393 A | 9/2000 | Schweid et al. | |
| 6,252,680 B1 | 6/2001 | Schweid et al. | |
| 6,310,660 B1 | 10/2001 | Abuali et al. | |
| 6,490,008 B1 | 12/2002 | Harrington | |
| 6,956,960 B2 * | 10/2005 | Kondo et al. | 382/107 |
| 7,173,971 B2 | 2/2007 | Amara et al. | |
| 7,349,475 B2 * | 3/2008 | Itoh et al. | 375/240.16 |
| 7,643,088 B2 | 1/2010 | Silverstein et al. | |
| 8,144,777 B2 * | 3/2012 | Itoh et al. | 375/240.16 |
| 8,244,061 B1 | 8/2012 | Carson et al. | |
| 2002/0131647 A1 | 9/2002 | Matthews | |
| 2002/0181762 A1 | 12/2002 | Silber | |
| 2004/0175139 A1 | 9/2004 | Tsumagari et al. | |
| 2005/0174900 A1 | 8/2005 | Kim et al. | |
| 2006/0114358 A1 * | 6/2006 | Silverstein et al. | 348/616 |
| 2006/0210191 A1 | 9/2006 | Silverstein | |
| 2006/0274210 A1 | 12/2006 | Kim | |
| 2007/0030900 A1 | 2/2007 | Verdu et al. | |
| 2007/0153904 A1 * | 7/2007 | Itoh et al. | 375/240.16 |
| 2007/0250893 A1 | 10/2007 | Akiyama et al. | |
| 2008/0165851 A1 | 7/2008 | Shi et al. | |
| 2008/0232765 A1 | 9/2008 | Patten et al. | |
| 2008/0239557 A1 | 10/2008 | Gerasimov | |
| 2010/0177129 A1 | 7/2010 | Fredlund et al. | |
| 2011/0001850 A1 | 1/2011 | Gaubatz et al. | |

* cited by examiner

*Primary Examiner* — Vikkram Bali (74) *Attorney, Agent, or Firm* — Hall Estill Attorneys at Law (57) ABSTRACT

Apparatus and method for detecting human-visual artifacts in a video presentation. In accordance with some embodiments, a sequence of frames in a video presentation is received. Non-codec based visual artifacts in the video presentation are detected by comparing at least one similarity measurement value for non-immediately successive frames to at least one similarity measurement value for immediately successive frames within the sequence.

26 Claims, 6 Drawing Sheets

PEAK SIGNAL TO NOISE RATIO (PSNR)

FIG. 9

ORIGINAL IMAGE X1    DUPLICATE IMAGE Y1    DUPLICATE IMAGE Y2
                        (MSE=309)              (MSE=309)

FIG. 10

STRUCTURAL SIMILARITY (SSIM)

AUTOMATED DETECTION OF VIDEO ARTIFACTS IN AN INFORMATION SIGNAL

RELATED APPLICATIONS

The present application makes a claim of domestic priority to U.S. Provisional Patent Application No. 61/583,072 filed Jan. 4, 2012, the contents of which are hereby incorporated by reference.

BACKGROUND

An ongoing trend in the broadcast and production industry is to convert data from a baseband (e.g., analog) format to a file-based digital format. Converting data to digital format provides a number of advantages, such as facilitating the ability to efficiently edit, store, transmit, encode, reproduce and playback the data.

During an analog to digital format conversion process, an information signal (e.g., a video data set) may be initially read out from an analog storage medium, such as a videotape. Block-based transformation signal processing may be applied to the input information signal using digital coder-decoder circuits ("codecs") to provide a corresponding digitally compressed data set (digital file). One commonly employed video codec carries out data compression in accordance with the well known MPEG (Moving Pictures Expert Group) standards.

The resulting digital data set may be arranged as a sequence of video frames which are displayed at a predetermined rate (e.g., 30 frames per second) during playback on an end user display device (e.g., a television). Commonly employed codecs may generate the individual frames by providing an array of pixels, with each pixel describing a single point of the video frame. Each pixel may be described in terms of both color and light intensity (luma value) using multi-bit digital values. Groups of pixels may be arranged into blocks, groups of blocks may form macroblocks, and groups of macroblocks may compose the entire frame. In this way, the codecs can describe the frame using the smallest unit that changes from one frame to the next, thereby reducing the size of the digital data set.

The digital conversion process can introduce a number of different types of digital artifacts into the digital data set, such as blockiness (noticeable block transitions) and ringing (blurry edges). A number of operable solutions have been proposed in the art to reduce the effects of digital artifacts that are induced by the operation of a codec, such as a downstream digital signal processing circuit that takes the output of the codec and applies averaging or blending techniques to the encoded digital data set.

Another form of artifact that may be present in a digitally encoded data set may be referred to as a source-based (baseband) artifact. Unlike the codec-based artifacts that arise by operation of the codec, baseband artifacts are present in the initial information signal itself prior to codec processing. Baseband artifacts may arise for a number of reasons, such as but not limited to noise, RF signal variations (e.g., drop outs) from the analog readback head, and low RF SNR (signal to noise ratio) characteristics of the recorded data from an analog storage medium (e.g., tape).

Source-based artifacts in a digitally encoded data set can be detected by comparing the decoded playback of a digital data set to the playback of the original source data set on a frame-by-frame basis. Such comparison, however, generally requires the availability of the medium on which the original analog data set is stored (e.g., the source tape), and can be time and resource intensive since the comparison may require playing back the source data at its normal playback rate (e.g., realtime playback).

SUMMARY

Various embodiments of the present disclosure are generally directed to an apparatus and method for detecting human-visual artifacts in a video presentation.

In accordance with some embodiments, a sequence of frames in a video presentation is received. A non-codec based visual artifact in the video presentation is detected by comparing a first similarity measurement value for non-immediately successive frames to a second similarity measurement value for immediately successive frames within the sequence.

These and other features and advantages of various embodiments of the present disclosure can be understood from a review of the following detailed description in conjunction with the accompanying drawings.

DETAILED DISCUSSION

The present disclosure is generally directed to detecting human-visual artifacts in a video presentation (stream). The system may operate in an environment in which an original source video (e.g., original video tape, film, etc.) from which the video presentation originates is not available for a direct comparison with the stream.

In some embodiments, the system automatically isolates a sequence of frames associated with a particular scene within the presentation, detects motion within the associated frames within the scene, and performs inter-frame comparisons of immediately successive and non-immediately successive frames within the sequence on non-motion related portions thereof to detect human-perceptible visual artifacts (defects).

The presence of one or more defects is flagged to allow further processing. Post-processing corrective actions may be taken to reduce or eliminate the impact of the detected artifacts. A variety of similarity measurements can be generated to facilitate the inter-frame comparisons, including structural similarity (SSIM) measurement values, mean square error (MSE) measurement values, and/or peak signal to noise ratio (PSNR) measurement values. Difference values between successive pairs of similarity measurement values can further be monitored to detect the artifacts.

Figure 1:
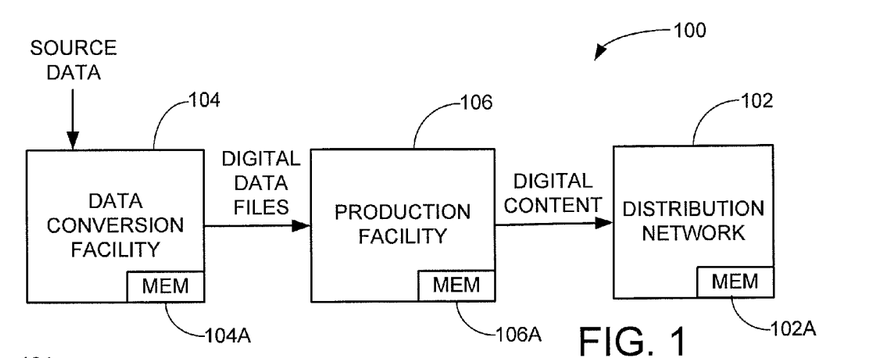
FIG. 1 is a functional block representation of a data handling system constructed and operated in accordance with various embodiments.

These and other features of various embodiments can be understood beginning with a review of FIG. 1, which provides a top level diagram for a data handling system 100. The data handling system is provided to show an exemplary embodiment in which various embodiments of the present disclosure can be employed. It will be appreciated that many other applications can employ the subject matter set forth herein, so those aspects depicted in FIG. 1 are merely for purposes of illustration and are not limiting.

The system 100 is characterized as a digital data distribution system in which digital content is broadcast or otherwise delivered to one or more end users through a distribution network 102. The content is processed by a data conversion facility 104 which operates to convert initial source data (e.g., analog data on an archive tape, film or other medium) into the form of one or more digital data files (data sets).

The data sets may be provided to a production facility 106 which processes the data sets to provide the digital content. The distribution network 102 may constitute a broadcast system that sends the content via cable television, airwave broadcast, Internet delivery, or some other delivery mechanism to the end user(s).

At this point it will be appreciated that the various embodiments discussed herein are not limited to network broadcasting, but can be utilized in any number of environments, including but not limited to the production of media (e.g., optical discs or other physical data storage media) that are then provided to the end users via commercial channels.

The processing carried out by the data conversion facility 104 and the production facility 106 may be at the same physical location, or may be in different locations. It is contemplated, although not required, that in at least some situations these will be different parties, so that the original source data from the source media will not be directly available to the production facility 106. For example, the data conversion facility 104 may be a company that provides digital data services to convert archived data sets, such as old audio/video works, into a digital format. The production facility 106 may process the formatted data in preparation for distribution by the network 102.

The respective network 102, data conversion facility 104 and production facility 106 blocks are each shown to include one or more physical memory locations (mem) 102A, 104A and 106A. The memories represent computer-readable physical data storage memory devices used to store the various data sets during the respective operations of these blocks. The memories may take any variety of forms including volatile or non-volatile memory, RAM, flash, disc-based memory, cache memory, buffers, and so on. More than one physical device and/or type of physical device can form the respective memories 102A, 104A, 106A.

Figure 2:
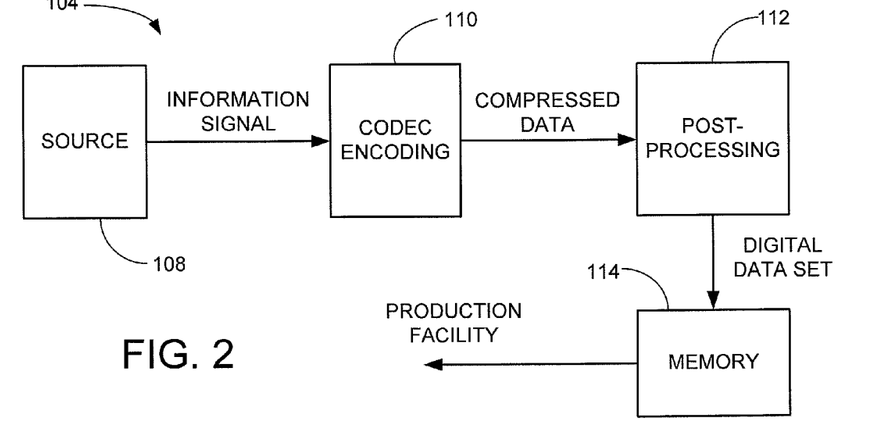
FIG. 2 shows functional aspects of the data conversion facility of FIG. 1 in accordance with some embodiments.

FIG. 2 shows processing of the input source data that may be carried out by the data conversion facility 104 of FIG. 1. It will be appreciated that these various elements are exemplary and other system configurations can readily be employed as desired, depending on the requirements of a given application. One or more of the blocks shown in FIG. 2 can be combined into a single hardware, firmware and/or software based controller or other circuitry.

For purposes of the present discussion, it will be contemplated that the data being processed by the facility 104 in FIG. 2 constitutes video data (e.g., a video component of a movie or other visual work). This is merely illustrative and not limiting, as any number of different formats of pixelated data may be used as desired. It is further contemplated that the original video data set is stored on a magnetic medium, such as a video tape. This is also merely illustrative and not limiting, as any number of different types of source media can be used, including but not limited to magnetic discs, optical discs, solid state memory, film, and so on. Thus, while some embodiments are directed to an analog input signal, such is not necessarily required. For example, the source data may be initially stored in a first digital format and the information processing is applied to convert the data to a different, second digital format.

A source block 108, such as a videotape playback system, transduces an analog data storage medium to generate an information signal that is supplied to a codec encoding block 110. The codec encoding block 110 generates compressed data as a series of digitally encoded frames. The compressed data are processed by a post-processing block 112 to provide a final encoded digital data set. This post-processing may include the detection and correction of various codec-based artifacts induced in the data set by the codec encoding block 110. The data set may be temporarily stored in memory 114 for subsequent transmission to the production facility 106.

Figure 3:
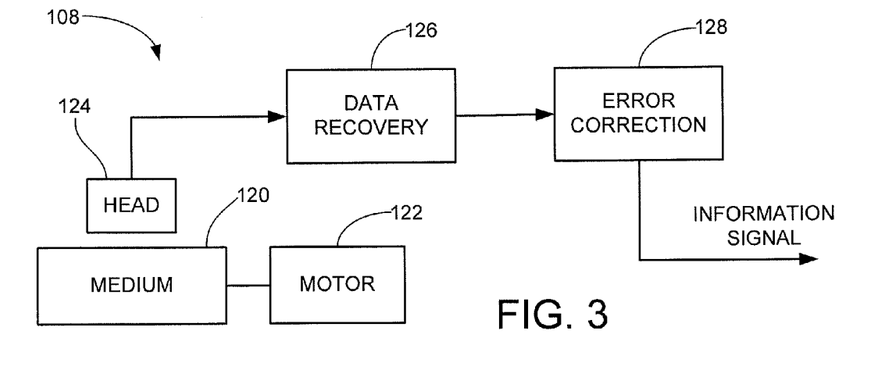
FIG. 3 depicts functional aspects of the source block of FIG. 2 in accordance with some embodiments.

FIG. 3 is an exemplary representation of the source block 108 of FIG. 2 in accordance with some embodiments. Other forms may be employed. A magnetic storage medium (in this case, video tape) 120 is advanced via a motor 122 adjacent a data transducing head 124 (e.g., tape head) to transduce a readback signal therefrom. A data recovery readback channel 126 processes the readback signal. In some cases, an error correction block 128 may apply automated error correction to detected errors in the recovered signal (e.g., drop outs, pops, etc.).

Because of the analog nature of the exemplary source block 102 in FIG. 3, the information signals may, from time to time, include human visually detectable source-based artifacts. Such artifacts may arise for a number of reasons. Defects associated with the medium (e.g., grown defects, age) may interfere with ability of the readback system to accurately replay the data. The readback head may demonstrate suboptimum performance and require cleaning or replacement, and this suboptimum performance may introduce source-based artifacts. Artifacts may arise due to noise introduced into the recovered signal, or by the operation of the error correction block.

It has been found that the automated error correction of blocks such as 128 can sometimes result in the generation of visually perceptible source-based artifacts in the baseband output video frame (e.g., the above identified information signal) as well as in any subsequently encoded digital file formed from the baseband signal. Such artifacts can include but are not limited to the following: block-based pixel arrays (most commonly 8×8 groups of pixels, but can vary in size, depending on the tape), where every other pixel in a block has been dropped out completely or has widely varying luma components from its neighbor, creating a mesh-like effect in a specific block; alternating high and low luma values in scan lines of a block; blocks or macroblocks held from a previous frame; blocks or macroblocks which become visible in the frame due to a lack of information to encode those blocks or macroblocks; and constant chroma or missing chroma with very high luma in a single pixel or small group of pixels that does not occur in more than one-half of the surrounding pixels. Other source-based artifacts may arise depending on the circumstances.

Some artifacts that exist on the original tape may be difficult to detect after the codec conversion process. Examples include macroblocking artifacts that exist in the original digital tape frame and align on the digital tape codec's macroblock boundaries, but due to a different codec used during the ingest process, the original artifacts do not line up on the new codec's macroblock boundaries. Other sources of artifacts may include film tearing, dirt, analog noise, block-based digital drop outs, and other artifacts that do not have a well defined mathematical basis (e.g., are not necessarily codec induced).

Figure 4:
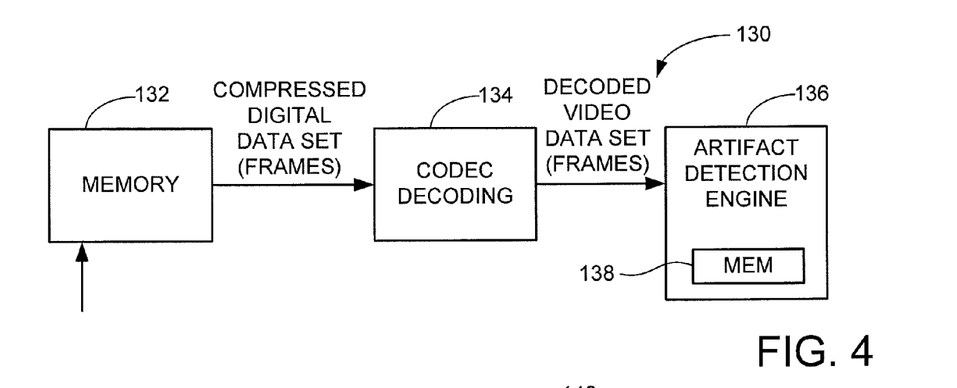
FIG. 4 represents operation of an automated artifact detection system in accordance with some embodiments.

Accordingly, an automated artifact detection system is provided such as shown at 130 in FIG. 4. The artifact detection system 130 can be utilized by the production facility 106 (FIG. 1) to analyze input data supplied by the content provider 104. The system 130 generally operates to detect source-based artifacts by decompressing (decoding) the compressed video data set to provide a decoded video data set (if required), followed by analyzing the video data set on a frame-basis to detect the presence of source based defects. The source based defects can be detected independently of the original media from which the video was generated by the source.

In accordance with at least some embodiments, a digital data set is temporarily stored in a suitable memory location 132. The data set is read out of the memory and decoded using a codec decoding block 134 to provide decoded baseband video frames. The decoded frames are analyzed by an artifact detection engine 136 to detect the presence of source-based artifacts. The engine 136 may have associated memory 138 to store the frame data and control data, including calculated similarity measurement values, difference values and operational parameters. The various elements in FIG. 4 can take a variety of forms, such as a hardware, firmware or software based controller.

Figure 5:
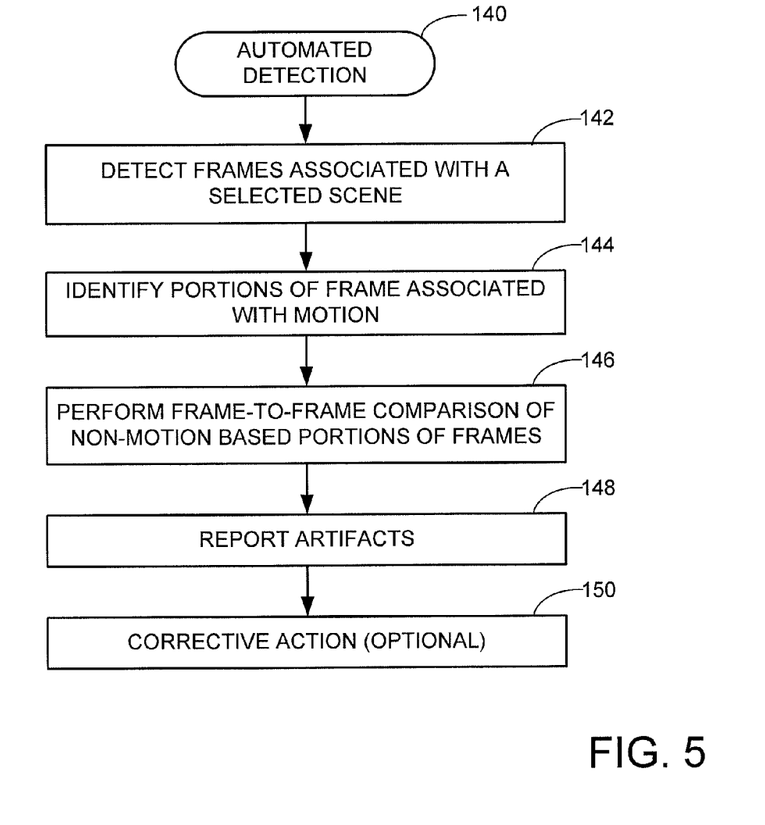
FIG. 5 is a flow chart for an AUTOMATED DETECTION routine carried out by the system of FIG. 4.

FIG. 5 sets forth a flow chart for an AUTOMATED DETECTION routine 140 representative of exemplary steps that may be carried out in accordance with various embodiments by the artifact detection engine 136 of FIG. 4. In the exemplary routine, a succession of high speed analysis steps is carried out on a frame-by-frame basis at a rate that is generally much higher than the normal display rate of the content.

As explained below in greater detail, the system generally operates to perform a number of steps that may be carried out sequentially or concurrently. To provide an overview, the exemplary routine includes detecting frames associated with a selected scene, step 142; identifying portions within the frames associated with motion at step 144; comparing portions of successive frames to detect the presence of artifacts at step 146; and, as desired, applying corrective actions at step 150 to reduce or eliminate the presence of the artifacts.

Video data sets (e.g., a motion picture, etc.) are often arranged as a series of pictures, or frames, which are successively presented in a temporal order to give the impression of motion as the pictures are shown at a specified rate of presentation (the frame rate). Generally, the video set will progress such that a series of frames will be similar to each other over a short period of time, followed by another series of frames that are similar to each other over a short period of time but dissimilar from the first series, and so on. Each series of similar frames is characterized as a scene, and the point at which the video set switches between similar series of frames is characterized as a scene change.

The dividing point between scenes may be somewhat arbitrary but is based on some measure of change in viewpoint, background lighting, objects depicted in the frame, etc. Thus for example, a conventional "scene" in a movie sense (an extended dialog between two people in a certain location) may be made up of a number of "artifact detection scenes," with a scene change occurring each time the camera changes its view to a different character.

Figure 6:
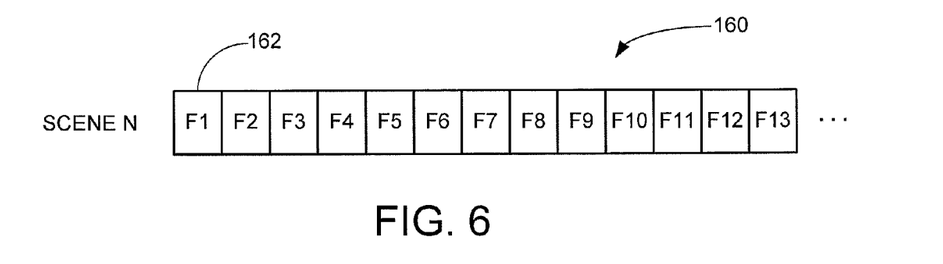
FIG. 6 illustrates a sequence of video frames processed in accordance with the routine of FIG. 5.

An exemplary artifact detection scene N is shown at 160 in FIG. 6. The scene N 160 is shown to include a number of frames 162 (denoted F1-F13). As noted above, each of the scenes F1-F13 in the artifact detection scene N may be slightly different, but will be generally the same.

During a scene, when dealing with a series of three frames in temporal presentation order, there will generally exist a high degree of structural similarity for the various objects represented in the frames. A variety of methods are known in the art to measure the degree of structural similarity between frames. These methods may include PSNR (peak signal-to-noise ratio), SSIM (structural similarity index measurement), JND (just noticeable difference), etc.

These and other types of structural similarity measurements can be used to determine if two frames are related by their visual content. Since the human visual system uses very similar concepts to determine if a picture in a moving series is broken-up or causing a disruption in viewing, it is possible to use a measurement of structural similarity to find several types of artifacts in motion pictures. A number of different approaches are disclosed and will now be discussed in turn.

In some embodiments, groups of three frames are successively compared in a given scene. With reference to FIG. 6, this may include comparing frames F1 and F3, F1 and F2, and F2 and F3. If non-immediately successive frames F1 and F3 are closely related, then it follows that the comparisons F1/F2 and F2/F3 should also provide indications of closely related frames.

Locating a potential visual disruption (e.g., a visual artifact) can be performed by noting similarity indexes in the F1/F2 and F2/F3 pairs that are well below the similarity index of the F1/F3 pair. In other words, if F1/F3 are closely related but F1/F2 and F2/F3 are not, there may be a visually detectable artifact (e.g., tear, dirt spot, etc.) in frame F2.

If a potential visual disruption is found, it may be necessary to filter out results that could have been caused by a high degree of motion in frame F2. This may be carried out in a number of ways, including through the use of existing motion detection techniques. If motion is high in frame F2, another method can be used to detect visual disruptions.

If motion is low in frame F2 and a potential visual disruption was noted, then it is possible to indicate, with a high degree of probability, that frame F2 is visually disruptive, as compared to frames F1 and F3. In this case a separate check can be made to determine if frame F2 is the start of a new scene, which can be performed by determining if the similarity index of the F1/F2 and F2/F3 pairs are far apart from a similarity index standpoint. If the indexes are far apart in value, then it is likely that frame F2 is in fact the start of a new scene, and thus, is not truly visually disruptive. Without a new scene detected, frame F2 is declared to be visually disruptive.

While groups of three (3) frames are chosen, this is merely exemplary and not limiting; other frame groupings (e.g., 10 frames, etc) can be used with comparisons in accordance with the foregoing discussion. For example, frames F1 and F10 might be compared, and if visually related then smaller intervals can be examined (e.g., comparison of F1 to F5; F5 to F10, etc.). Smaller and smaller groupings can be made until a disruption between two immediately successive frames can be detected.

In further embodiments, each group of n frames (e.g., n=3, etc.) are selected in each scene on a moving window basis, so that F1-F3 are evaluated, followed by F2-F4, and so on. Results of previous comparisons can be retained to reduce repeated comparisons. In some embodiments, no prior scene changes are detected. Prior scene change detections are not made; instead, frames are successively examined and scene changes are identified (and marked) on the fly.

In another approach, a similar comparison method is used as described above, except that each frame is divided into a series of blocks (windows), which are then used for comparison. By isolating portions of the frame and using those portions for comparison, it is possible to isolate areas of the frame where high motion prevents a proper measurement from those areas of the frame that make artifacting possible to detect.

Figure 7:
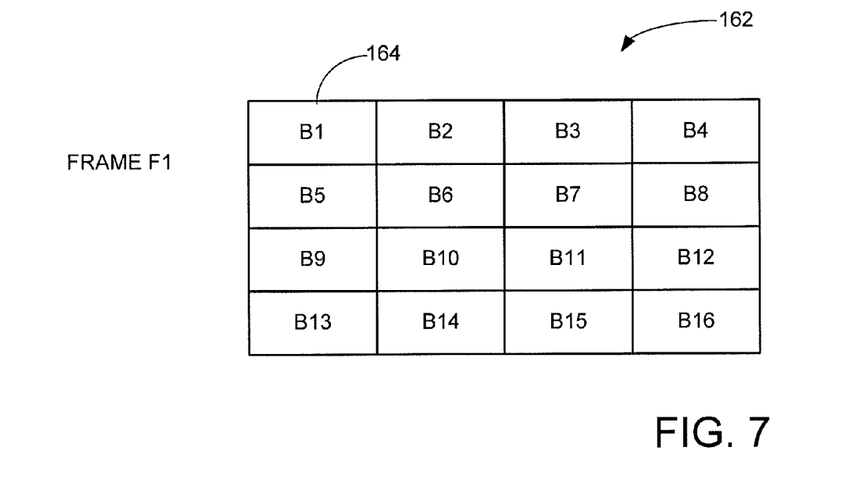
FIG. 7 shows portions of a selected frame from FIG. 6.

FIG. 7 shows an exemplary frame (e.g., Frame F1 from FIG. 6) divided into sixteen (16) equal sized blocks 164 denoted as B1-B16. Other groupings and arrangements of blocks (windows) can be made, including non-uniformly sized blocks. Motion detection mechanisms can be used to identify blocks involving motion (e.g., blurring, change in position as compared to the same block in a previous frame, etc.). In such case, the detection mechanism can be limited to those blocks not experiencing motion.

Figure 8:
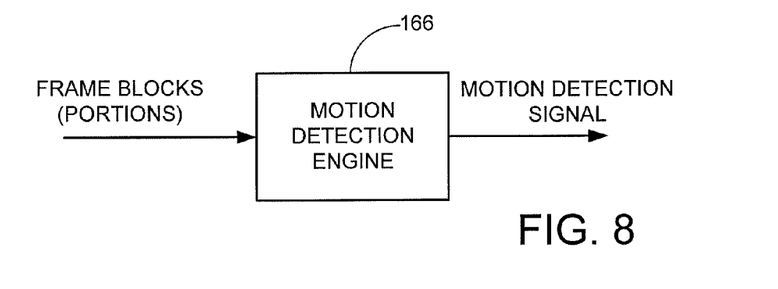
FIG. 8 provides a motion detection engine useful during operation of the routine of FIG. 5.

FIG. 8 depicts a motion detection engine 166, which may be realized in hardware or software. The motion detection engine 166 generally operates to evaluate the presence of significant levels of motion within each frame. The engine can carry out frame-to-frame comparisons, comparisons of blocks within an existing frame, and analyses of individual blocks. Applied techniques may include boundary detection and color spectrum analyses. The engine 166 may be configured to distinguish between out-of-focus blurring, indicative of camera focus differences (such as background objects, etc.) and motion-induced blurring caused by movement of the object. The engine can output a suitable motion detection signal to flag the various frame portions exhibiting motion induced features.

Continuing with FIG. 7, in another approach first and third frames are compared per group of 3 consecutive frames and the absolute difference between the previous comparison and the current comparison is stored in a list. For example, frames F1/F3, F4/F6 and F7/F9 can be compared. This list is then analyzed to determine if there are spikes (changes above a threshold) in values. Upon finding three or more consecutive spikes in this list the associated frame can be tagged as potentially containing an artifact.

It will be appreciated that if there are differences in first and third frame similarity index values from the previous first and third similarity index values (spikes), there will likely have been a change in the content of the most recently examined frame. If this occurs for two consecutive instances only, it could be a scene change as the frames tend to be similar after the scene change. If it was not a scene change and there are artifacts that occur across multiple frames, then there will be spikes for more than three consecutive indices.

As noted above, the similarity index values (similarity measures) can be obtained in a variety of ways. In some embodiments, pixel values (e.g., luma values Y, etc.) can be used in the comparisons. Benefits of the various techniques disclosed herein include the fact that visual artifacts can be quickly and automatically detected, enabling individual frames to be flagged as containing at least one defect.

Figures 9, 10:
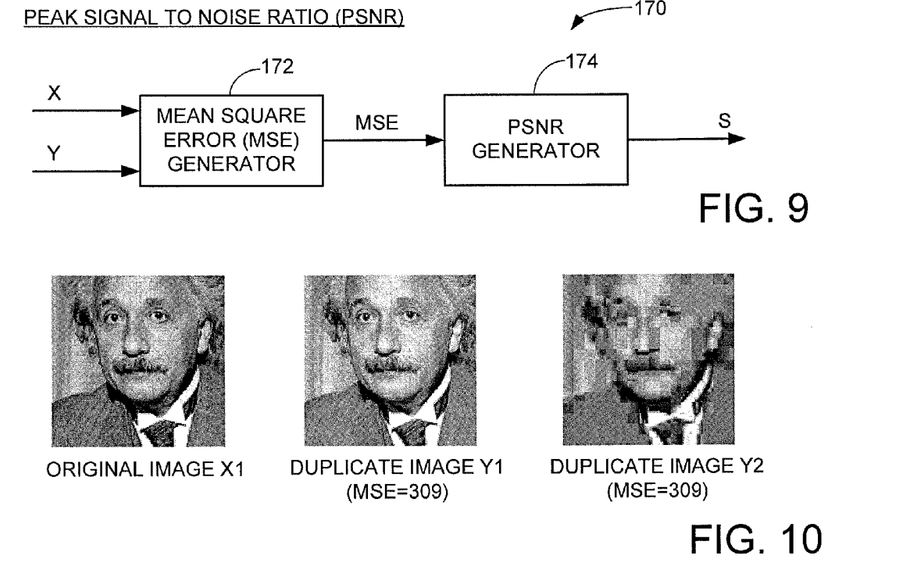
FIG. 9 is a functional block diagram of a circuit that generates a similarity measurement value using peak signal to noise ratio (PSNR) in accordance with some embodiments.
FIG. 10 is a sequence of images to illustrate operation of the circuit of FIG. 9.

In some embodiments peak signal to noise ratio (PNSR) techniques are used to generate a similarity measure between two images (two frames, two frame windows, etc.). FIG. 9 is a functional block representation of a similarity measurement circuit 170. The circuit 170 can be constructed in hardware and/or software and includes a mean square error (MSE) module 172 and a PNSR module 174.

The MSE module 172 generates an MSE term as the difference between two input images X and Y in accordance with the following relation:

$$MSE = \frac{1}{M \cdot N} \sum_{i=1}^{M} \sum_{j=1}^{N} (X_{ij} - Y_{ij}) \qquad (1)$$

where M is the width of the respective images (in pixels), N is the length of the respective images, $X_{ij}$ is the luma value (or other value) associated with each respective pixel in the first image, and $Y_{ij}$ is the luma value (or other value) associated with each respective pixel in the second image. The MSE value is a unitless mean square error value representative of the difference between the respective X and Y images. An MSE of 0 would occur for identical images (X=Y) and, generally, the larger the MSE value, (e.g., MSE=300, etc.), the less similarity will exist between the respective X and Y images.

The PNSR module 174 uses the MSE value obtained by the module 172 as follows:

$$PSNR = 10 \log_{10} \frac{L^2}{MSE} \qquad (2)$$

where L represents the dynamic range of the pixel values. The PSNR value can thus be used as the output similarity measurement value S, with a relatively greater magnitude representing a higher degree of difference (less similarity) and a relatively smaller magnitude representing a lower degree of difference (more similarity) between the images.

MSE and/or PSNR values are well known video quality metrics and can be used as the similarity measurements as disclosed herein. However, such measures can be inconsistent with human visual perception.

FIG. 10 shows a base image X1 and two distorted copies of the image Y1 and Y2. The MSE values for the X1/Y1 and X1/Y2 image pairs are identical (i.e., MSE=309). However, a human observer can readily perceive the Y1 image as being significantly more similar to the X1 image as compared to the similarity of the Y2 image to the X1 image.

A number of alternative similarity measures have been developed in the art to provide mathematically achievable measurement values that are more closely correlated to the human visual system. One such measurement is referred to as Structural Similarity (SSIM). SSIM evaluates luminescence (luma), contrast and intensity characteristics of two images to arrive at a similarity measure. An SSIM similarity measure can be determined by generating a mean intensity value μ and a standard deviation value σ for each image (X, Y) as follows:

$$\mu_X = \frac{1}{N}\sum_{i=1}^{N} X_i \quad (3)$$

$$\sigma_X = \sqrt{\frac{1}{N-1}\sum_{i=1}^{N}(X_i - \mu_X)^2}$$

$$\mu_Y = \frac{1}{N}\sum_{i=1}^{N} Y_i$$

$$\sigma_Y = \sqrt{\frac{1}{N-1}\sum_{i=1}^{N}(Y_i - \mu_X)^2}$$

A contrast comparison value c(X,Y) is determined in relation to the standard deviation values $\sigma_X$, $\sigma_Y$ as follows:

$$c(X, Y) = \frac{2\sigma_X \sigma_Y + C_1}{\sigma_X^2 + \sigma_Y^2 + C_1} \quad (4)$$

where $C_1$ is a constant. A luminance comparison value l(X,Y) can be similarly generated using the mean intensity values $\mu_X$, $\mu_Y$ as follows:

$$l(X, Y) = \frac{2\mu_X \mu_Y + C_2}{\mu_X^2 + \mu_Y^2 + C_2} \quad (5)$$

Where $C_2$ is a constant. A structural comparison s(X, Y) can be carried out as:

$$s_X = \frac{X - \mu_X}{\sigma_X} \quad (6)$$

$$s_Y = \frac{Y - \mu_Y}{\sigma_Y}$$

and the luminance, contrast and structural comparison values can be combined to provide a final SSIM value as:

$$\text{SSIM}(X,Y) = [l(X,Y)]^{\alpha} \cdot [c(X,Y)]^{\beta} \cdot [s(X,Y)]^{\gamma} \quad (7)$$

where the powers α, β and γ are selected to adjust the relative weighting of the respective comparison values. Other combinations of these terms, including a weighted sum, can be used as desired. The SSIM similarity measure is a unitless value usually expressed between 0 and 1. An SSIM similarity measure of 1 indicates identical X, Y images, and the SSIM similarity measure is reduced with greater differences between the images.

Figure 11:
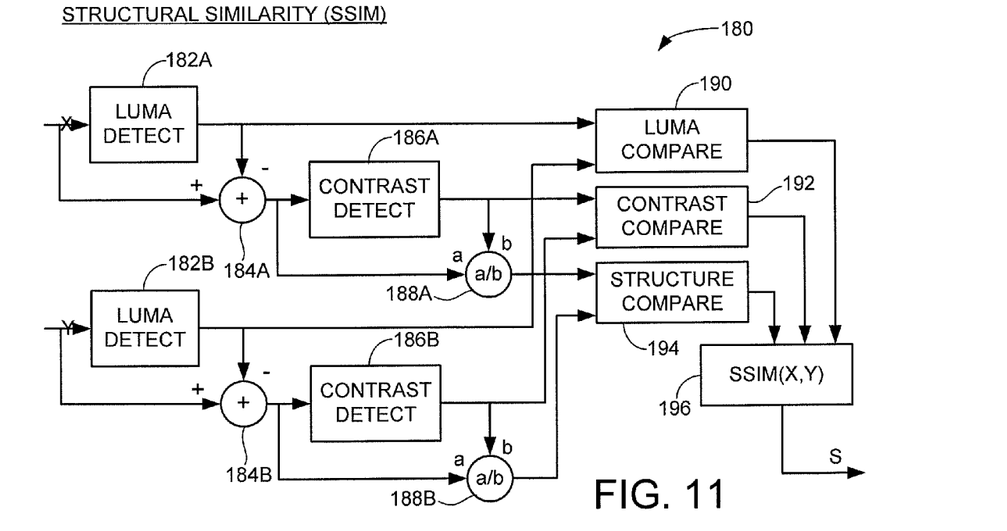
FIG. 11 is a functional block diagram of a circuit that generates a similarity measurement value using structural similarity (SSIM) techniques in accordance with other embodiments.

FIG. 11 provides a functional block representation for an SSIM generation circuit 180. The circuit 180 can be realized in hardware and/or software. The circuit 180 includes respective X and Y channel luma (luminescence) detection blocks 182A-B, summers 184A-B, contrast detection blocks 186A-B and product blocks 188A-188B. These blocks provide respective inputs to a luma compare block 190, a contrast compare block 192 and a structure compare block 194 to provide the operations of equations (3)-(6) above.

The outputs of blocks 190-194 are presented to an SSIM generation block 196 which generally operates to combine the respective luminescence, contrast and structural values in a weighted fashion, such as in equation (7), to provide an SSIM similarity measurement value S.

While the foregoing discussion has provided a detailed treatment of MSE, PSNR and SSIM similarity measurement values, it will be appreciated that this is merely illustrative and not limiting. Any number of suitable similarity measurement methodologies can be used to generate similarity measurement values for different images (e.g., frames, portions of frames, etc.).

Figure 12:
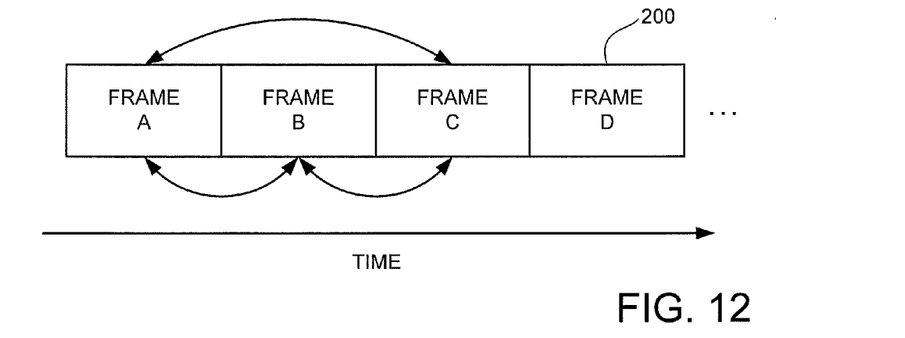
FIG. 12 depicts sequential processing of multiple video frames to detect artifacts in accordance with further embodiments.

FIG. 12 illustrates four frames 200, denoted as frames A-D. The frames 200 are presented in a temporal sequence to illustrate full-frame analysis by the artifact detection system 130 (see FIG. 4) in greater detail. Scene change detection can be initially carried out by evaluating sets of three consecutive frames. After generating similarity measurement values for frame-pairs A/B, A/C and B/C (such as SSIM values from FIG. 11), the system 130 proceeds to evaluate the similarity values of frame A and frame C. For example, the system 130 can evaluate a similarity interval as follows:

$$\text{SSIM}(A,C) > T \quad (8)$$

where SSIM(A, C) is the similarity measure for frames A and C, and T is a selected threshold value. It will be appreciated that the comparison to a threshold will depend on the nature of the similarity value used (e.g., MSE, SSIM, etc.). If the frames A and C are found to be closely related, a scene change has not likely occurred, and the system advances to evaluate the next three frames (e.g., generate similarity measures for frame-pairs B/C, B/D and C/D). A scene change may be confirmed if the subsequent frames (E, F, G, etc.) are similar to frame C and all of these frames are different from frames A, B.

Once a scene change is detected, the frames associated with the selected scene are grouped together for further analysis of the frames within that scene. Similarity measurements obtained during these steps can be temporarily stored in local memory for subsequent reference.

The system 130 next compares A/B and B/C to A/C. If A/B and B/C are not closely related to A/C, then frame B is different, and an investigation can take place to determine whether the difference is caused by the presence of an artifact in frame B, or for some other reason, such as motion in frame B. Frame B can thus be subjected to analysis by the motion detection engine 168. If low (or non-existent) motion is detected in frame B relative to motion in frames A and C, it can be concluded with a high degree of probability that an artifact is present in frame B, and frame B can be flagged accordingly.

FIG. 12 illustrates windowed frame comparison analysis of the frames 200 (A-D) in FIG. 12. Each of the frames A-D are divided into portions, or windows 202. The analysis of FIG. 13 can be carried out in addition to, or in lieu of, the analysis of FIG. 12 and is carried out in a similar manner except on a window-by-window basis. For example, the system 130 can successively evaluate window pairs such as A1/C1, A4/C4, A7/C7 etc., and repeat these analyses with corresponding windows in frames A/B and B/C, with a view toward evaluating relative similarity between these window pairs. Such analysis can be used to detect scene changes at a greater resolution than in FIG. 12, as well as detecting the locations of artifacts.

Figure 13:
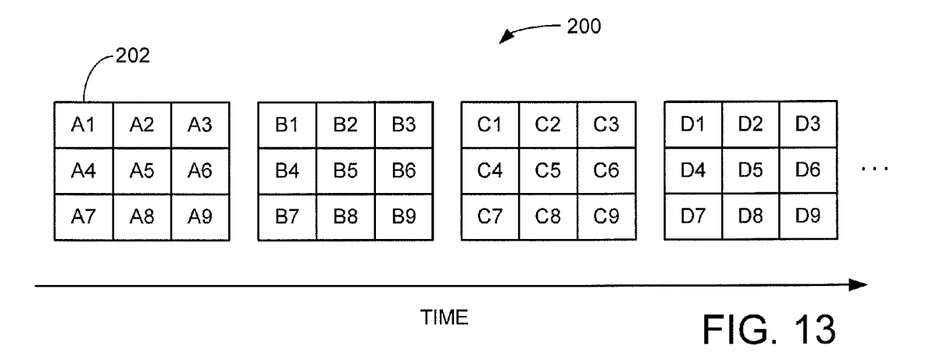
FIG. 13 shows sequential processing of portions of the video frames of FIG. 12 to detect artifacts in accordance with some embodiments.

Any suitable window size can be used, including breaking up a frame into non-uniformly sized windows (e.g., one relatively larger central window and several smaller border windows, etc.). The individual window-level similarity measures can be combined into larger values, such as for groups of windows or the entire frame.

Figure 14:
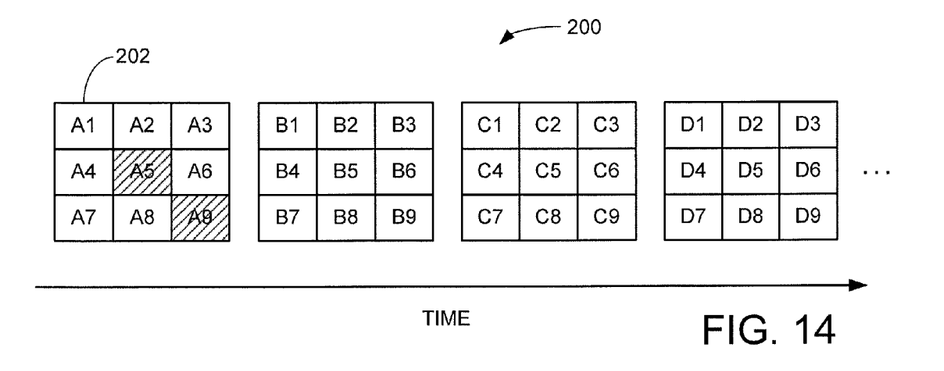
FIG. 14 provides further processing of the frames of FIG. 12 in accordance with other embodiments.

FIG. 14 illustrates the frames 200 and associated windows 202 from FIG. 13. In this approach, each of the windows 202 is subjected to motion detection by the engine 168 (FIG. 8) to identify windows that include the presence of motion features. In FIG. 13, windows A5 and A9 are contemplated as exhibiting motion. The windows A5 and A9, as well as windows B5 and B9 from frame B and windows C5 and C9 from frame C are accordingly omitted from the similarity analysis.

Figure 15:
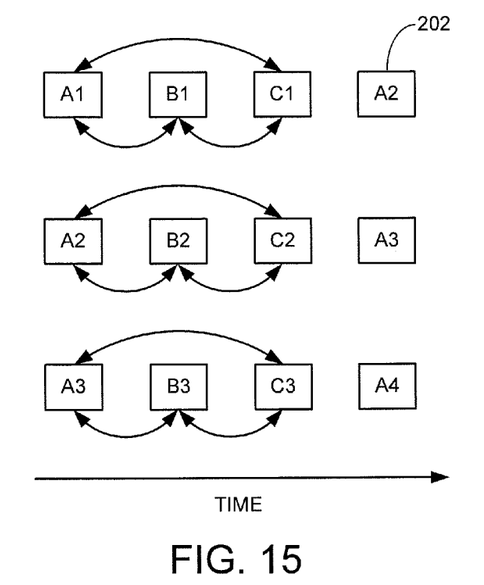
FIG. 15 depicts artifact detection upon portions of successive frames in accordance with some embodiments.
Figure 16:
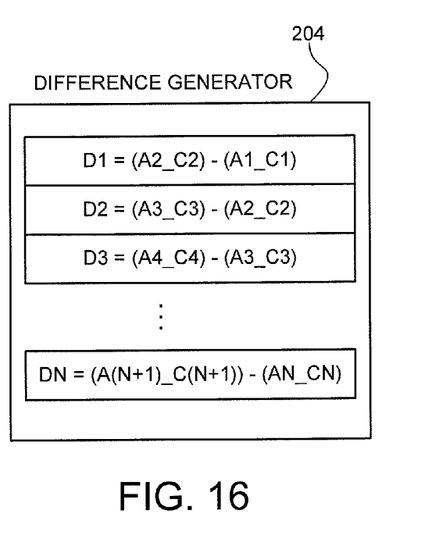
FIG. 16 illustrates operation of a difference generator operative during the routine of FIG. 5.

FIGS. 15-16 illustrate the use of a running difference array that is generated to analyze the similarity measures between different windows 202. A difference generator module 204, which may be realized in hardware and/or software, generates a sequence of difference values D1 to DN as shown for different pairs of the windows. For example, a first difference value D1 is generated in relation to the difference between the similarity measure for windows A2 and C2 (A2_C2) and windows A1 and C1 (A1_C1). This allows the system to monitor for changes in the difference values that fall within selected thresholds.

It will be appreciated that the difference values can be generated in a variety of ways so that the difference values depicted in FIG. 16 are merely exemplary and are not limiting. Different combinations of similarity measurement values can be used such as a first similarity measurement value for a first pair of immediately adjacent frames (e.g., A/B) and a second similarity measurement value for a second pair of non-immediately adjacent frames (e.g., A/C).

Figure 17:
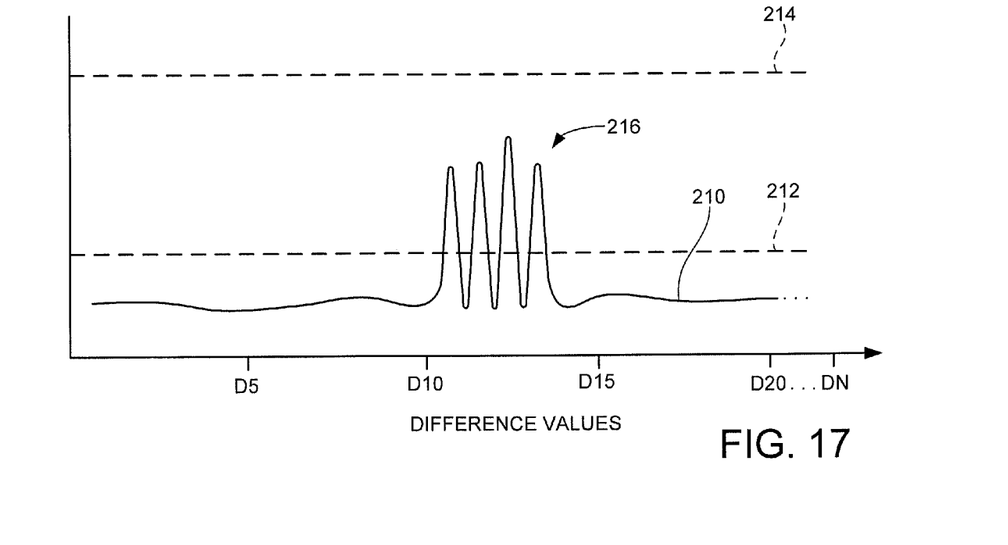
FIG. 17 provides a graphical representation of difference values obtained by the operation of the difference generator of FIG. 16.

FIG. 17 is a graphical curve 210 to plot difference values obtained by the difference generator 204. The difference value curve 210 is plotted against a difference value sample x-axis and an absolute magnitude y-axis. Threshold 212 generally represents a first threshold above a nominal, or average, difference value. Threshold 214 generally represents a second threshold indicative of scene changes. Difference values that extend above the first threshold 212 and below the second threshold 214 are thus likely caused by the presence of source based artifacts in the video presentation. The thresholds 212, 214 can be empirically derived and adaptively adjusted based on observed performance.

Curve 210 has a sequence of peaks 216 for the difference values D11-D14 that extend into the detection zone between the thresholds 212, 214. By monitoring the difference values from the generator 204, exceptions such as at 216 can be flagged for further processing as discussed above in FIG. 5.

In some embodiments, a display system can be provided to display those frames flagged as having a defect on a monitor or other graphical user interface (GUI) for human perceptual analysis. This can be carried out for all flagged frames, or for a sample of such frames. Parametric adjustments can be made to the system based on these findings. Specially configured test video files with predetermined artifact characteristics can be processed by the system for calibration and adjustment purposes.

It will now be appreciated that the various embodiments presented herein can provide a number of benefits. Automated detection of video source defects can be carried out over time intervals significantly shorter than a normal playback interval for a video. This can facilitate, for example, on-the-fly detection during a broadcast or other stream event. The automated capabilities of the system eliminates the requirement to access the original source of the video in order to detect the defects. Motion detection and rejection capabilities will improve the detection rate of actual artifacts and enhance the overall statistical validity of the similarity measurements.

For purposes of the appended claims, the term "non-codec based visual artifact" and the like will be understood consistent with the foregoing discussion to describe human perceptible artifacts in a video presentation that arise other than as a result of a codec algorithm during compression and/or decompression of the video data, such as the aforementioned source based artifacts arising from the playback or generation of the initial video data set.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
   receiving a sequence of frames in a video presentation; and
   detecting a non-codec based visual artifact in the video presentation by comparing a first similarity measurement value for non-immediately successive frames to a second similarity measurement value for immediately successive frames within the sequence.

2. The method of claim 1, in which the detecting step comprises identifying a subset of successive frames associated with a selected scene, and evaluating the subset of successive frames for said visual artifacts.

3. The method of claim 1, further comprising identifying portions of said frames involving motion and comparing portions of said frames that do not include detected motion.

4. The method of claim 1, in which the first and second similarity measurement values each comprise a structural similarity (SSIM) measurement value.

5. The method of claim 1, in which the first and second similarity measurement values each comprise a mean square error (MSE) similarity measurement value.

6. The method of claim 1, in which the first and second similarity measurement values each comprise a peak signal to noise ratio (PSNR) value.

7. The method of claim 1, in which each of the frames is divided into a plurality of windows at different coordinates within the respective frames and comparing the windows from different frames sharing the same coordinates.

8. The method of claim 1, in which the detecting step comprises generating a difference value between the first and second similarity measurement values, and identifying the artifact responsive to a magnitude of the difference value exceeding a first threshold value.

9. The method of claim 8, in which a scene change within the detecting step is detected responsive to the difference value exceeding a second threshold value greater than the first threshold value.

10. The method of claim 1, in which the sequence of frames in a video presentation are decoded video data, and the method further comprises prior steps of outputting an initial data set from a source and applying codec decoding to the initial video data set to provide the decoded video data.

11. The method of claim 10, further comprising a prior step of reading an analog video data set from a memory and processing the analog video data set to provide the initial data set as a compressed digital data set.

12. The method of claim 11, in which the memory is characterized as a video tape, and the detecting step detects the visual artifacts as artifacts associated with the playback of the video tape.

13. The method of claim 1, further comprising flagging at least one frame identified as having one of said visual artifacts.

14. The method of claim 13, further comprising applying corrective action to the flagged at least one frame to correct the visual artifact.

15. The method of claim 1, in which the video presentation is broadcast over a network.

16. An apparatus comprising:
a memory adapted to receive and temporarily store a sequence of frames in a video presentation; and
an artifact detection engine adapted to detect a non-codec based visual artifact in the video presentation by comparing a first similarity measurement value for non-immediately successive frames to a second similarity measurement value for immediately successive frames within the sequence.

17. The apparatus of claim 16, further comprising a codec decoding block which applies decompression decoding to an initial set of compressed video frames to provide the sequence of frames for analysis by the artifact detection engine.

18. The apparatus of claim 16, in which the artifact detection engine divides each frame in the sequence into a plurality of windows each window having a different set of coordinates within the respective frames, and generates similarity measurement values for the windows in different frames sharing the same coordinates.

19. The apparatus of claim 16, in which the artifact detection engine comprises a motion detection engine which detects portions of said frames exhibiting motion, the artifact detection engine removing said portions from inclusion in the generation of similarity measurement values.

20. The apparatus of claim 16, in which the artifact detection engine identifies a subset of successive frames associated with a selected scene, and evaluates the subset of successive frames for said visual artifacts before proceeding to evaluate a next scene in the video presentation.

21. The apparatus of claim 16, in which the first and second similarity measures each comprise a mean square error (MSE) similarity measurement value.

22. The apparatus of claim 16, in which the first and second similarity measures each comprise a structural similarity (SSIM) measurement value.

23. The apparatus of claim 16, in which the artifact detection engine further generates a difference value between similarity measures of different pairs of frames, and identifies a frame as potentially having a source based defect responsive to a magnitude of the difference value exceeding a first threshold value.

24. The apparatus of claim 23, in which the artifact detection engine further detects a scene change within the video presentation responsive to the magnitude of the difference value exceeding a second, higher threshold value.

25. The apparatus of claim 16, in which the video presentation is obtained from a source which reads an analog video data set from a memory, the engine detecting artifacts arising responsive to the reading of said analog video data set.

26. The apparatus of claim 23, in which the memory is characterized as a video tape, and the engine detects the visual artifacts as artifacts associated with the playback of the video tape.

* * * * *